United States Patent [19]

Rashidi

[11] Patent Number: 6,059,214

[45] Date of Patent: May 9, 2000

[54] VERTICAL MOVING SUPPORT VEHICULAR ATTACHMENT

[75] Inventor: Majid Rashidi, Pepper Pike, Ohio

[73] Assignee: Cleveland State University, Cleveland, Ohio

[21] Appl. No.: 09/249,754

[22] Filed: Feb. 16, 1999

[51] Int. Cl.[7] .................................................. B65H 75/44
[52] U.S. Cl. ...................... 242/399.1; 242/403; 242/557; 242/559.4; 137/355.12; 187/229; 254/323
[58] Field of Search .............................. 242/399.1, 399.2, 242/403, 557, 559.4; 137/355.12; 187/229; 134/168 C; 254/323

[56] References Cited

U.S. PATENT DOCUMENTS

| | | |
|---|---|---|
| Re. 34,585 | 4/1994 | Schmidt et al. . |
| 2,261,930 | 11/1941 | Abbe ........................................ 187/229 |
| 3,314,562 | 4/1967 | Farmer . |
| 3,658,589 | 4/1972 | Shaddock ......................... 134/168 C X |
| 3,727,781 | 4/1973 | Ramsey ................................. 187/229 X |
| 3,739,985 | 6/1973 | Odom et al. . |
| 3,829,064 | 8/1974 | Jackson . |
| 3,884,528 | 5/1975 | Shaddock . |
| 3,958,594 | 5/1976 | Masters . |
| 4,084,715 | 4/1978 | Stedman ............................... 187/229 X |
| 4,199,837 | 4/1980 | Fisco, Jr. .......................... 134/168 C X |
| 4,339,096 | 7/1982 | May ........................................ 242/557 |
| 4,487,218 | 12/1984 | Sifri . |
| 4,896,686 | 1/1990 | Schmidt, Jr. et al. .............. 254/323 X |
| 4,993,443 | 2/1991 | Buchert . |
| 5,246,181 | 9/1993 | Straub et al. ........................ 242/399.2 |
| 5,476,234 | 12/1995 | St. Pierre ................................ 242/557 |

*Primary Examiner*—Donald P. Walsh
*Assistant Examiner*—Minh-Chau Pham
*Attorney, Agent, or Firm*—Jane Marciniszyn

[57] ABSTRACT

A front mounted attachment for sewer cleaning vehicles consisting of four-bar linkage assemblies and hydraulic cylinders. The tray supporting the discharge hose storage reel has three positions; a driving position, a use position and a maintenance position. The four-bar linkage assemblies include a ground, a crank, a connecting rod and a follower. The tray using the four-bar linkage assemblies and hydraulic cylinders is raised and lowered along an axis vertical to the ground. The tray does not move to and away from the vehicle.

7 Claims, 6 Drawing Sheets

VERTICAL MOVING SUPPORT VEHICULAR ATTACHMENT

TECHNICAL FIELD

The present invention relates to a vehicle attachment that supports a discharge hose storage reel, and particularly to an attachment that mounts to a front end of a vehicle and moves vertically up and down with respect to the vehicle.

BACKGROUND OF THE INVENTION

Underground sewer systems are composed of catch basins and sewer laterals. The catch basins are perpendicular to the ground and the sewer laterals are parallel to the ground. The catch basin is generally deeper than the sewer lateral. When the sewer lateral becomes clogged with depris, the rodding equipment first passes through the catch basin to the sewer lateral. The rodding equipment, generally, consists of a water reservoir, a high pressure pump, a discharge hose storage reel, a discharge hose mounted on the reel and extendable therefrom. The discharge hose is fitted with a nozzle having an aperature which provides a jet stream directed backward toward the hose. To open the closed sewer lateral, a vehicle provided with the rodding equipment is driven to a position over a manhole cover. The discharge hose is unwound from the discharge hose storage reel and extended through the manhole and catch basin to the clogged sewer lateral.

Discharge hose storage reels are large and heavy because as much as one thousand feet of one-inch diameter flexible hose may be required for extended sewer laterals. The discharge hose storage reel can be carried by attachments to the nose, tail or amidship of its associated vehicle. U.S. Pat. No. Re. 34,585 depicts a nose attachment. The attachment has two positions, i.e., the vehicle movement and use position, and the maintenance position. The attachment moves laterally both toward and away from the vehicle but always remaining at the same distance from the ground. When the attachment is toward the vehicle, the vehicle can be moving or the discharge hose can be in use. When the attachment is away from the vehicle, the vehicle hood can swing forward clear of the discharge hose storage reel thereby allowing for maintenance of the vehicle motor.

A disadvantage of the vehicle attachment disclosed in U.S. Pat. No. Re. 34,585 is the level of the attachment with respect to the ground while the discharge hose is in use. It is too low for a good angle of reach of the discharge hose. When the attachment is located on the tail of the vehicle, it is difficult for the vehicle driver to situate the attachment supporting the discharge storage hose reel over a manhole.

It is thus a primary object of the present invention to provide a vehicle attachment that moves vertically up and down with respect to the vehicle.

It is also an object of the present invention to provide a vehicle attachment that can be raised in order to secure a good angle of reach of the discharge hose into a sewer lateral.

It is another object of the present invention to provide a vehicle attachment that can be easily situated over a manhole.

It is a related object of the present invention to provide a vehicle attachment that moves vertically downward for ease in maintenance of the vehicle motor under the vehicle hood.

It is a further object of the present invention to provide a vehicle attachment that remains the same distance from the vehicle when it is in a driving position, a use position and a maintenance position.

It is a still further object of the present invention to provide a vehicle with a front mounted attachment supporting the discharge storage hose reel and discharge hose.

It is an even further object of the present invention to provide a vehicle attachment that allows a vehicle driver to have a good field of vision while driving the vehicle.

These and other objects of the present invention, which will become apparent from the description to follow, are accomplished by improvements hereinafter described and claimed.

SUMMARY OF THE INVENTION

This invention is directed to a novel vertical moving support vehicle attachment apparatus of the character described, one that solves the above and many other problems in a wide variety of trades and satisfies the need for a vehicle attachment apparatus having four-bar linkage assemblies.

In its broader aspects, the front mount vehicle attachment apparatus of the present invention is for a ground traveling sewer cleaning vehicle and includes a discharge hose reel support tray, a platform, a first hydraulic cylinder and a positioning means. The tray has two sides, a front end and a back end. The platform is attached to the front end of the vehicle. The first hydraulic cylinder connects the back end of the tray with the platform. The positioning means orientates the tray. The positioning means moves the tray up and down along an axis vertical to the ground while the tray remains at a constant distance from the vehicle.

In its broader aspects, the positioning means is a first and second four-bar linkage assembly that attaches to each side of the tray. Each four bar-linkage assemblies comprise a ground, a crank, a connecting rod and a follower. The ground has a first and second end. The crank has a first and second end. The connecting rod has a first and second end and a mid-point. The follower has a first, a second and a third end. The first end of the ground is attached to the second end of the crank and the second end of the ground is attached to the second end of the follower. The first end of the crank is attachd to the first end of the connecting rod. The second end of the connecting rod is attached to a side of the tray. The first end of the follower is attached to the mid-point of the connecting rod. Each of the four-bar assemblies further includes a ground, a crank and a follower. The second ground has a first end and a second end. The second crank has a first end and second end. The second follower has a first end, a second end and a third end. The first end of the second ground is attached to the second end of the second crank and the second end of the second ground is attached to the second end of the second follower. The first end of the second crank is attached to the first end of the connecting rod. First end of the second follower is attached to the mid-point of the connecting rod. A rod connects the third end of the first follower with the third end of the second follower.

The various features and advantages of the invention will become more apparent from the detailed description of a preferred embodiment of the invention when considered along with the accompanying drawings.

BEST MODE FOR CARRYING OUT THE INVENTION

Figure 1:
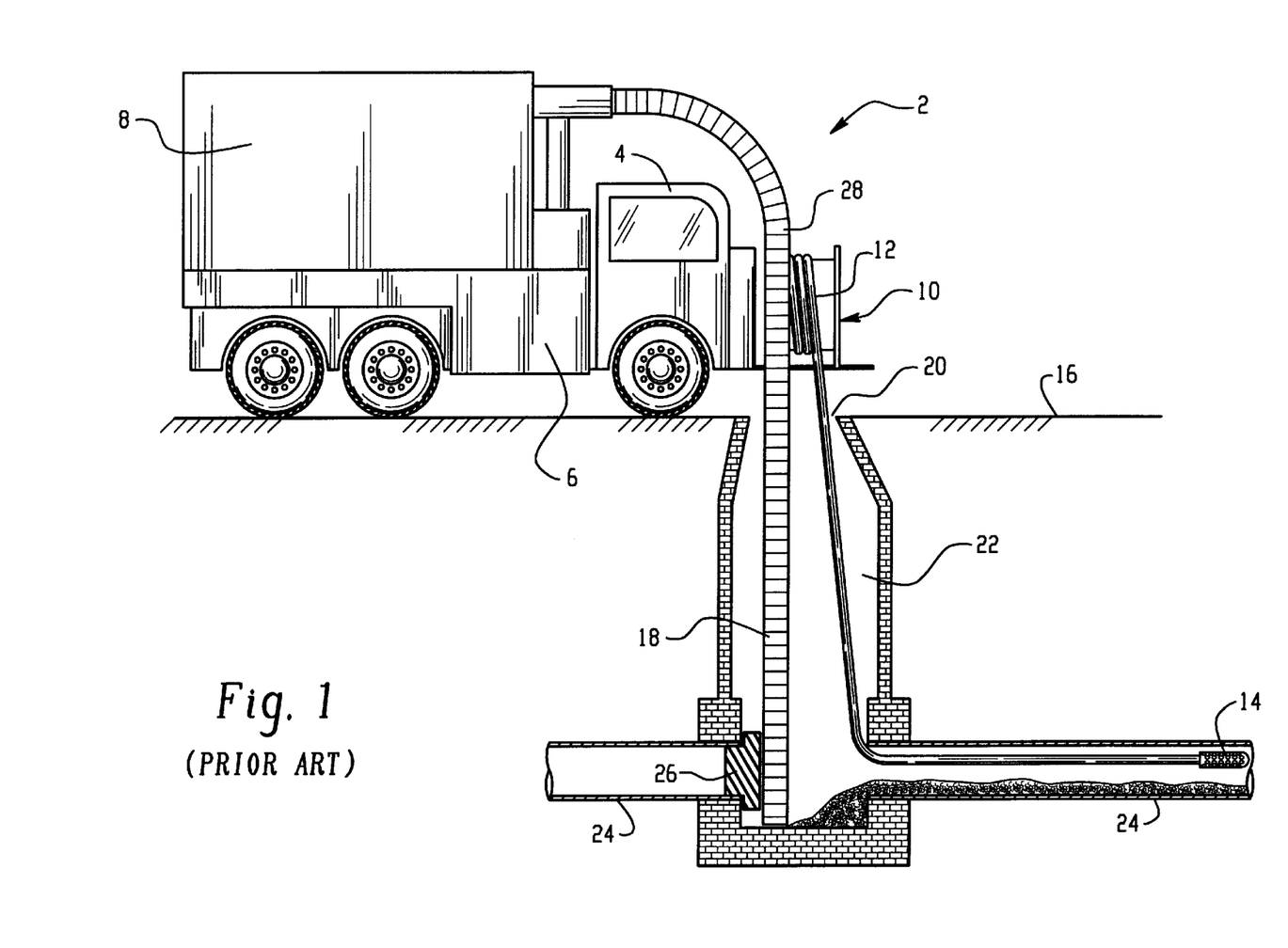
FIG. 1 is a side view of a catch basin and sewer cleaning vehicle which incorporates the prior art discharge hose storage reel and is included to describe generally the catch basin and sewer cleaning operation.

Referring to the drawings in greater detail, and first to FIG. 1 which illustrates a typical catch basin, sewer lateral and prior art ground traveling sewer cleaning vehicle 2 having the discharge hose storage reel situated over a manhole. The ground traveling sewer cleaning vehicle 2 is typically an internal combustion engine propelled truck with a driver's cab 4, and a large closed evacuated container 8, over a water tank 6. A discharge hose storage reel 10 is mounted on the front end of the cab 4 and a flexible extendable discharge hose 12 is wound on the hose reel 10. The discharge hose 12 may be equipped with a self-propelling spray nozzle 14.

At the start of a sewer cleaning operation, the vehicle 2 is moved over a street or road 16 to position its discharge hose storage reel 10 and flexible vacuum conduit 18 over or closely adjacent an open manhole top 20 of the catch basin 22 having sewer laterals 24 radiating generally horizontally therefrom. The discharge hose 12 is unwound from the hose reel 10 to lower the nozzle 14 into the bottom region of the catch basin. The nozzle is then positioned into one of the sewer laterals 24 and water is pumped through the discharge hose 12 supplied by the water tank 6 to form a rearward directed water spray from the nozzle 14 to propel forwardly the nozzle 14 through the sewer lateral 24.

When the nozzle 14 reaches a desired position in the sewer lateral 24, such as at or near adjacent catch basin connection to the catch basin 22, a winding winch (not shown) for the hose reel 10 is activated to retract the discharge hose 12 back through the sewer lateral 24 and catch basin 22, dragging the nozzle 14 therewith while the water spray continues to flow. This effects a backwashing of the sewer lateral 24, where debris is flushed out of the sewer lateral 24 with the water spray into the catch basin 22. To prevent the flushed debris from flowing out of the catch basin 22 through another sewer lateral 24, the other sewer laterals 24 have their catch basin entrance ways each covered with a screen plug 26, which will only accommodate flow of liquids out of the catch basin 22. Conveniently, prior to the start of the operation referred to above in relation to the nozzle 14, extension conduits 18 are mounted on the free end of the flexible conduit 28 to depend therefrom into the bottom of the catch basin 22. Thus, at the time retraction of the discharge hose 12 commences, air is pulled through the flexible container vacuum conduit 18 and the container 8, thereby creating a partial vacuum in the container 8 and an associated air stream through the conduit 28 which causes the debris to flow out of the bottom of the catch basin 22 into the container 8. Such operation readily permits the simultaneous cleaning of both the sewer lateral 24 and the catch basin 22 in a consecutive fashion.

After the completion of this operation, the water collected in the container 8 may be discharged into the catch basin 22 from a water drain outlet (not shown) along the bottom of the container 8, leaving only solid debris in the container 8. Upon completion of the water draining operation, and when the container 8 is full of solid depris, the vehicle 2 is driven to a dumping area.

Figure 2:
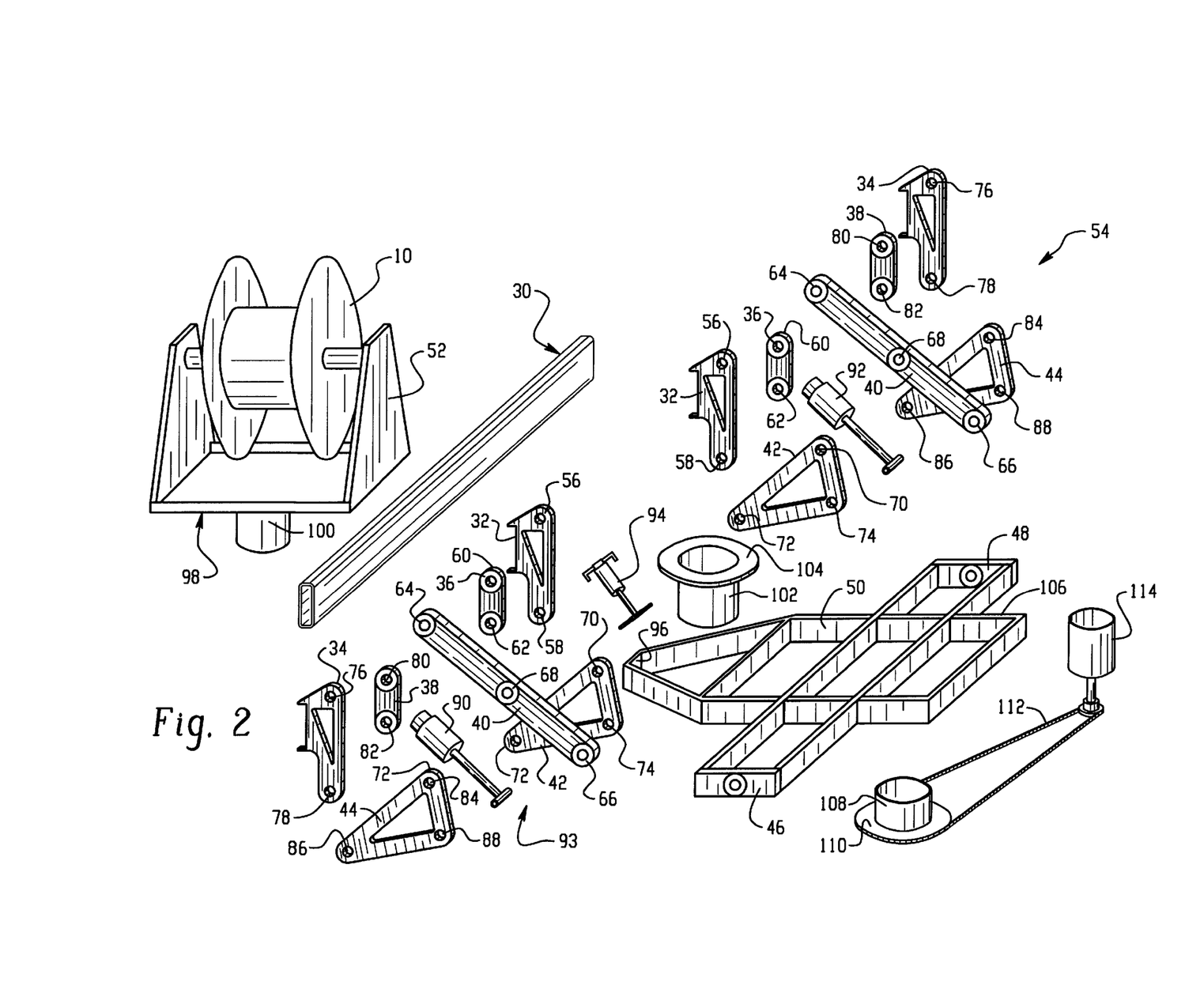
FIG. 2 is an exploded view of the present invention.
Figure 3:
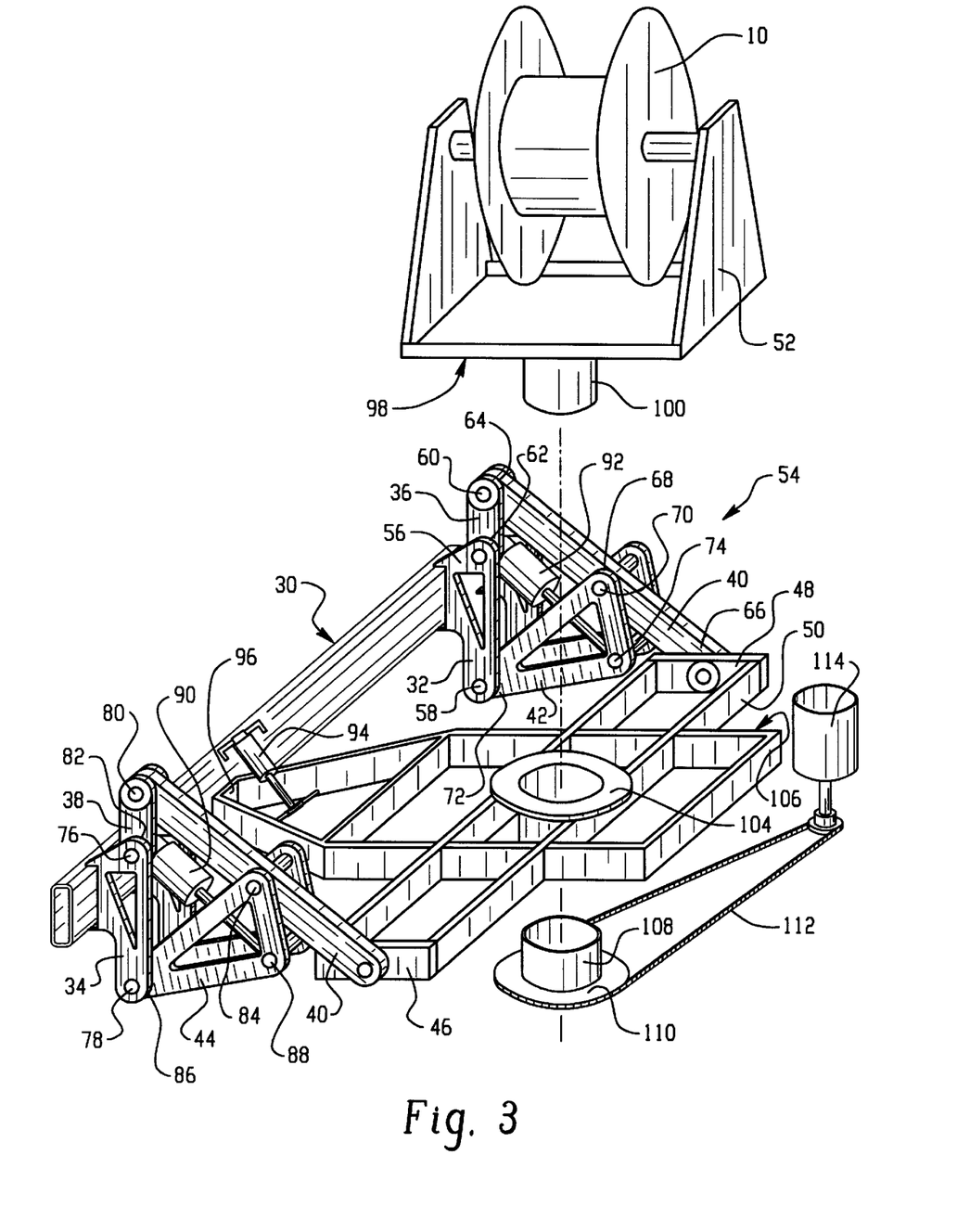
FIG. 3 is a partially exploded view of the present invention.

FIGS. 2 and 3 illustrate a front mounted ground traveling sewer cleaning vehicle attachment apparatus. The vehicle 2 includes a platform 30 that is mounted to the front end or nose of the vehicle. The platform 30 can be metal or the like material. There are two positioning means assemblies attached to each side of the platform 30. Each positioning means assembly consists of a four-bar linkage assembly 93 and hydraulic cylinders 90 and 92. The four-bar linkage assemblies comprise grounds 32 and 34, cranks 36 and 38, connecting rod 40 and two followers 42 and 44. The grounds 32 and 34 attach at each end of the platform 30. The grounds 32 and 34 can be attached to the platform 30 by welding them thereto. The cranks 36 and 38 are attached to the grounds 32 and 34 and the cranks are eight inches in length. The cranks 36 and 38 are attached to the grounds 32 and 34 by pins or the like. A connecting rod 40 is attached to the cranks 36 and 38. The connecting rod 40 which is forty-one inches in length is attached to the cranks 36 and 38 by pins or the like. The followers 42 and 44 are connected to the connecting rod 40 and the grounds 32 and 34. The followers 42 and 44 are attached to the connecting rod 40 and grounds 32 and 34 using pins or the like. The connecting rod 40 is attached to each side 46 and 48 of a tray 50 that supports a frame 52 holding the discharge hose storage reel 10.

FIG. 2 illustrates an exploded view and FIG. 3 illustrates a partially exploded view of the moving support vehicle attachment apparatus 54. The grounds 32 that attach to platform 30 have a first end 56 and a second end 58. The cranks 36 have a first end 60 and a second end 62. The first end 56 of grounds 32 is attached to the second end 62 of cranks 36. The connecting rods 40 have a first end 64, a second end 66 and a midpoint 68. The first end 60 of cranks 36 is attached to the first end 64 of connecting rods 40. The second end 66 of connecting rods 40 is connected to the sides 46 and 48 of the tray 50. The followers 42 have a first end 70, a second end 72, and a third end 74. The first end 70 of followers 42 is connected to the midpoint 68 of connecting rod 40. The second end 72 of followers 40 is connected to the second end 58 of grounds 32. The grounds 34 that attach to the platform 30 have a first end 76 and a second end 78. The cranks 38 have a first end 80 and a second end 82. The first end 76 of grounds 34 attaches to the second end 80 of the cranks 38. The first end 80 of cranks 38 attaches to the first end 64 of connecting rods 40. The followers 44 have a first end 84, a second end 86 and a third end 88. The first end 84 of followers 44 is connected to midpoint 68 of connecting rod 40. The second end 86 of followers 44 is connected to the second end 78 of grounds 34. The third ends 74 and 88 of followers 42 and 44 are connected. The distance between end one and end two of the follower is twenty inches. Hydraulic cylinders 90 and 92 are each connected to platform 30 and a connection pin between the third ends 74 and 88 of the followers 42 and 44.

Figure 4:
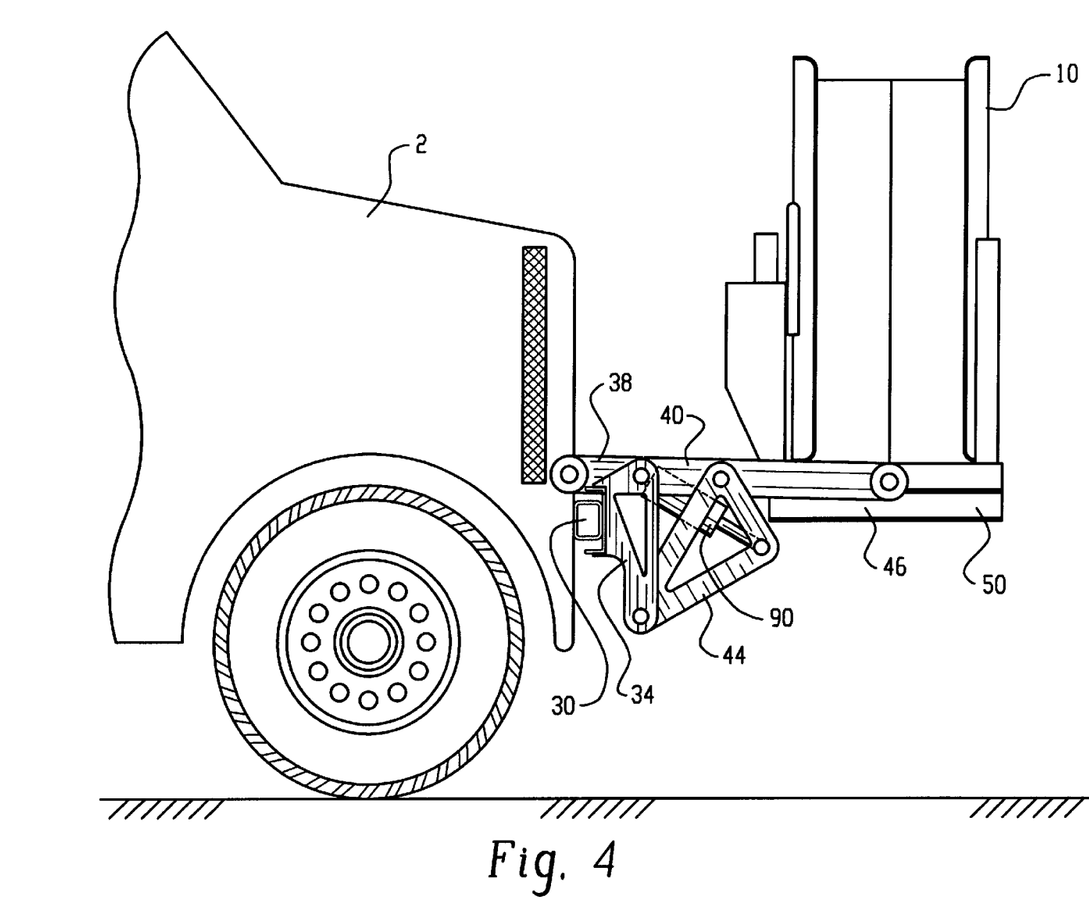
FIG. 4 is a side view of the present invention with a front mounted vehicle attachment apparatus in a use position.
Figure 5:
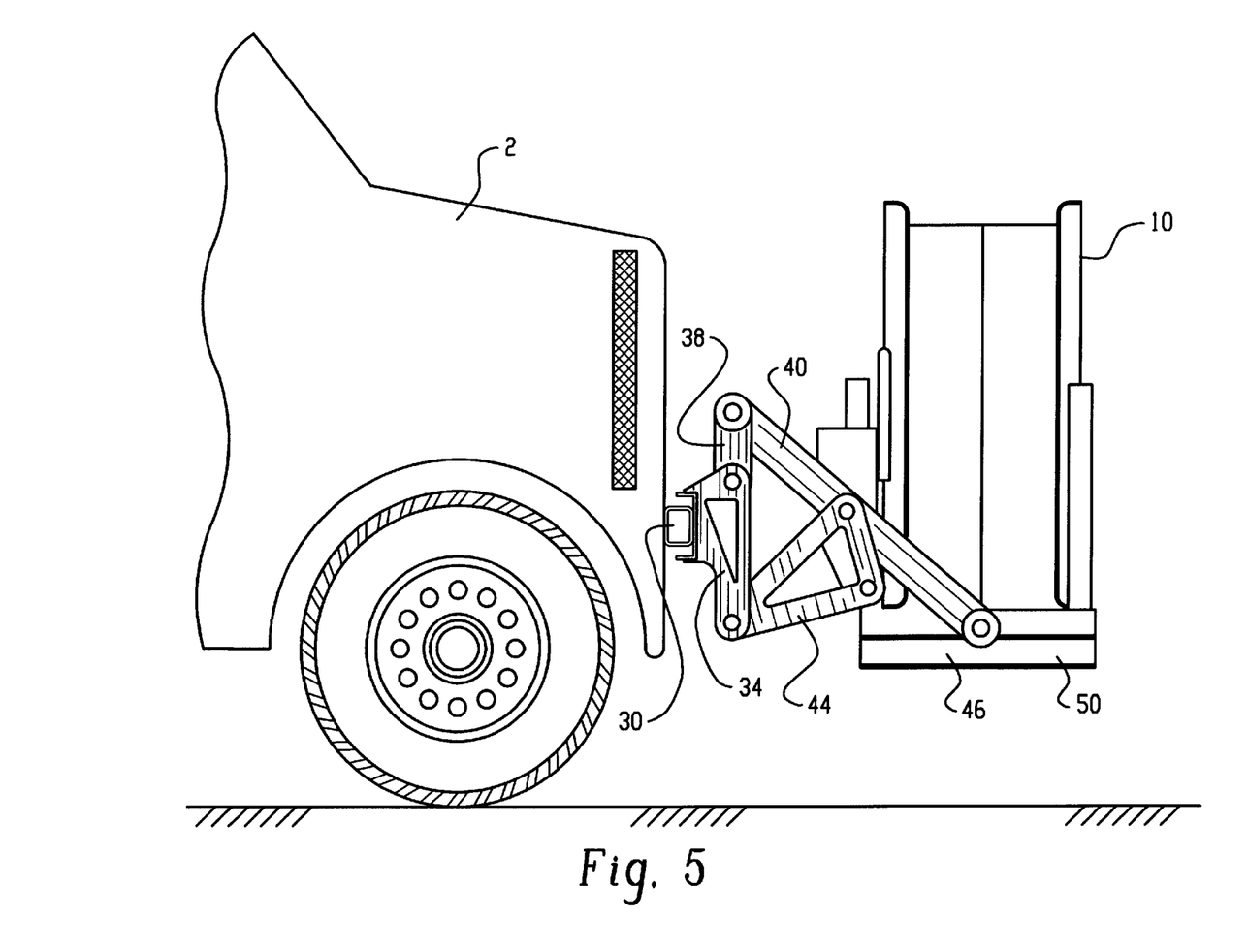
FIG. 5 is a side view of the present invention with the front mounted vehicle attachment apparatus in a driving position.
Figure 6:
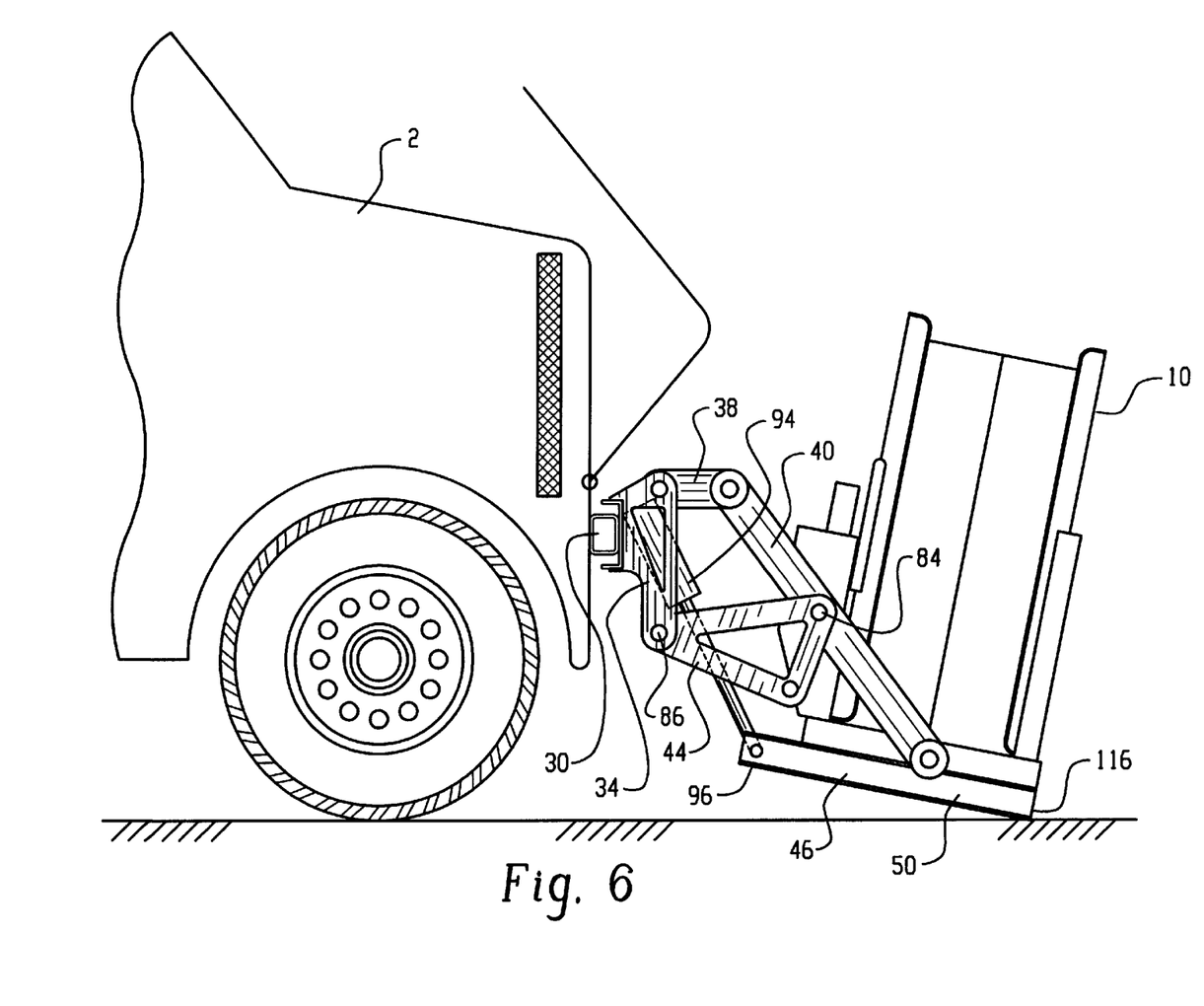
FIG. 6 is a side view of the present invention with the front mounted vehicle attachment apparatus in a maintenance position.

Hydraulic cylinders 90 and 92 and the four-bar linkage assemblies 93 are used to orient the tray 50 to a use position from a driving position and to lower the tray 50 to the drive position. FIGS. 3 and 4 illustrate the four-bar linkage assemblies 93 in the use position, FIG. 5 illustrates the four-bar linkage assemblies 93 in the driving position and FIG. 6 illustrates the four-bar linkage assemblies 93 in a position for vehicle motor repair. The tray 50 is in a raised position when the tray 50 is in the use position compared to the tray 50 in the driving position. A first hydraulic cylinder 94 is attached to the platform 30 and the back end 96 of the tray 50. This hydraulic cylinder is used to level the tray 50 with respect to the horizontal plane, i.e., the road 16. When the tray 50 is raised from the driving position to the use position by hydraulic cylinders 90 and 92 and the four-bar linkage assemblies 93 the back 96 of the tray 50 remains at a lower position. Hydraulic cylinder 94 is used to raise the back of the tray 50 with respect to a horizontal position. When lowering the tray 50 from the use position to the driving position, hydraulic cylinder 90 and 92 and the four-bar linkage assemblies 93 lower part of the tray 50 and hydraulic cylinder 94 lowers the back 96 of the tray 50 so that the tray 50 is horizontal with respect to the road. In the driving position the tray is fifteen inches from the ground and a distance of the back end of the tray to the vehicle is about forty-eight inches. The four-bar linkage assemblies 93 are used to lower tray 50 to the maintenance position as shown in FIG. 6. The positioning means, i.e., four-bar linkage assembly, 93 and hydraulic cylinders 90, 92 and 94 move the tray 50 up and down along an axis vertical to the road 16 while the tray 50 remains at a constant distance from the vehicle 2.

The discharge hose storage reel 10 is supported by frame 52. Welded to the lower surface 98 of the frame is a cylinder 100. The cylinder 100 fits into a pipe 102 having a flange 104. The flange 104 rests on the upper surface 106 of tray 50 and the pipe 102 fits through the tray and into extension 108. Attached to extension 108 is disc 110. A chain 112 connects disc 110 to a hydraulic motor 114. Hydraulic motor 114 rotates frame 52 about tray 50.

FIG. 5 illustrates the four-bar linkage assemblies in the driving position. Cranks 36 and 38 are vertical with respect to the road 16. The tray 50 is approximately fifteen inches off the road. The tray 50 is horizontal with respect to the road. FIGS. 2 and 4 illustrates the four-bar linkage assemblies in the use position. Using hydraulic cylinders 90 and 92 cranks 36 and 38 rotate toward the vehicle. The connecting rods 40 are then raised with their end points 66 remaining at the same horizontal distance from the vehicle through out the entire range of raising motion. The sides 46 and 48 of the tray 50 are raised from the driving position by the same height as that of end points 66 of the connecting rod 40. The back end of tray 50 is raised by hydraulic cylinder 94 so that tray 50 becomes horizontal with respect to the ground 16. After use, the tray 50 is lowered to the driving position using hydraulic cylinders 90, 92 and 94. FIG. 6 illustrates the four-bar linkage assemblies in the lowered or maintenance position so that the hood of the vehicle can be raised. Hydraulic cylinders 90 and 92 partially lower the tray 50. The cranks 36 and 38 are parallel to the road and side ends 84 and 86 of the followers 42 and 44 are parallel with the road. Hydraulic cylinder 94 need not be used. Thus, the tray 50 is not horizontal with the road. The back end 96 of the tray 50 is higher than the front end 116 of the tray 50 thereby allowing for more space for opening the hood of the vehicle.

The present invention has been described with a degree of particularity. It is the intent, however, that the invention includes all modifications and alterations from the disclosed embodiments falling within the spirit or scope of the appended claims.

What is claimed is:

1. A front attachment apparatus for a ground traveling sewar cleaning vehicle comprising:

a. a discharge hose reel support tray having two sides, a front end and a back end;

b. a platform attached to a front end of a vehicle;

c. a first hydraulic cylinder connecting said back end of said tray with said platform; and d. a means for positioning said tray, wherein said positioning means moves said tray up and down along an axis vertical to the ground while said tray remains at a constant horizontal distance from arbitrarily fixed vertical axis to the ground and positioned through said vehicle.

2. The front vehicle attachment apparatus according to claim 1, wherein said positioning means comprises a first and a second four-bar linkage assembly attached to each side of said tray.

3. The front vehicle attachment apparatus according to claim 2, wherein said first and said second four-bar linkage assembly each comprises a ground having a first end and a second end, a crank having a first end and a second end, a connecting rod having a first end, a second end and a mid-point, and a follower having a first end, a second end, and a third end, wherein said first end of said ground is attached to said second end of said crank and said second end of said ground is attached to said second end of said follower, wherein said first end of said crank is attached to said first end of said connecting rod, wherein said second end of said connecting rod is attached to said side of said tray, and said mid-point of said connecting rod is attached to said first end of said follower.

4. The front vehicle attachment apparatus according to claim 3, wherein said first and second four-bar linkage assemblies each further including a second ground having a first end and a second end, a second crank having a first end and a second end, and a second follower having a first end, a second end and a third end, wherein said first end of said second ground is attached to said second end of said second crank and said second end of said second ground is attached to said second end of said second follower, wherein said first end of said second crank is attached to said first end of said connecting rod, wherein said first end of said second follower is attached to said mid-point of said connecting rod, and wherein a pin connects said third end of said first follower and said third end of said second follower.

5. The front vehicle attachment apparatus according to claim 4, further including a second and a third hydraulic cylinder, wherein said second and said third hydraulic cylinders connect said platform and said rods connecting said third end of said first and said second followers of said first and said second four-bar linkage assemblies, wherein said cylinders adjust said four-bar linkage assemblies between use, drive and maintenance positions, wherein in said use position said cranks are parallel to said connecting rods and said tray is horizontal with respect to the ground, wherein in said driving position said cranks are vertical along an axis to the ground and said tray is parallel to the ground, and wherein in said maintenance position said cranks and a line between said first and said second ends of said followers are parallel and wherein a first hydraulic cylinder maintains said tray parallel to the ground in said use and said drive positions.

6. The front vehicle attachment apparatus according to claim 5, wherein an upper surface of said tray supports a frame which has a discharge hose storage reel thereon, wherein on a lower surface of said frame is a cylinder that fits into a pipe with a flange attached thereto, said pipe fits through an opening in said tray into an extension having a disc attached thereto, wherein a chain connects said disc to a hydraulic motor, and wherein said frame is rotated on said tray by action of said hydraulic motor and chain on said disc.

7. The front vehicle attachment apparatus according to claim 6, wherein said crank is eight inches in length, said connecting rod is forty-one inches in length, a distance between said end one and said end two of said first and second follower is twenty inches, when said tray in said driving position said tray is fifteen inches from the ground and a distance of said back end of said tray to said vehicle is about forty-eight inches.

* * * * *